United States Patent [19]

Janetzky

[11] 4,301,532

[45] Nov. 17, 1981

[54] ARRANGEMENT FOR TRANSMITTING DIGITAL DATA SIGNALS

[75] Inventor: Dittmar Janetzky, Karlsruhe, Fed. Rep. of Germany

[73] Assignee: Siemens Aktiengesellschaft, Munich, Fed. Rep. of Germany

[21] Appl. No.: 68,427

[22] Filed: Aug. 21, 1979

[30] Foreign Application Priority Data

Aug. 25, 1978 [DE] Fed. Rep. of Germany ....... 2837214

[51] Int. Cl.³ ............................ H04J 3/06; H04J 3/08
[52] U.S. Cl. ......................................... 370/85; 370/88
[58] Field of Search ............................ 370/86, 88, 85

[56] References Cited

U.S. PATENT DOCUMENTS

| Re. 28,811 | 5/1976 | Pierce | 370/88 |
|---|---|---|---|
| 3,810,103 | 5/1974 | Ricci | |
| 3,824,545 | 7/1974 | Brenner | 370/85 |
| 3,937,892 | 2/1976 | Bloch | 370/85 |
| 4,052,566 | 10/1977 | MacKay | 370/85 |
| 4,052,567 | 10/1977 | MacKay | 370/85 |
| 4,156,112 | 5/1979 | Moreland | 370/85 |

OTHER PUBLICATIONS

Electronik, 1975, vol. 23, No. 4, pp. 72–78, and No. 5, pp. 73–78.
Electronics, 1974, No. 23, Nov. 14, 1974, pp. 95–106.
Hewlett-Packard Journal, 1975, No. 5, pp. 2–4.

Primary Examiner—David L. Stewart
Attorney, Agent, or Firm—Kenyon & Kenyon

[57] ABSTRACT

In an arrangement for transmitting digital data signals between subscriber stations which are connected to a common data and control line, each subscriber station contains a clock generator with all clock generators synchronized via a common clock line. The station sending data signals switches the data during a given clock phase to the data line, and the stations receiving data likewise accept the data during a given clock phase. All clock generators are held in the given clock phase until data are accepted so that all clock generators are synchronized to the slowest clock.

10 Claims, 4 Drawing Figures

BL= AUXILIARY SIGNAL LINE
DL= DATA LINE
DSL= DATA AND CONTROL LINE
TST= SUBSCRIBER STATION

ARRANGEMENT FOR TRANSMITTING DIGITAL DATA SIGNALS

BACKGROUND OF THE INVENTION

This invention relates to digital data transmission in general and more particularly to an arrangement for transmitting digital data signals between subscriber stations which are connected to a common data and control line.

In U.S. Pat. No. 3,810,103, the journal "Hewlett-Packard Journal" 1975, No. 5, pages 2 to 4, as well as in the journal "Electronics", vol. 47 (1974), No. 23, pages 95 to 106, arrangements and methods for the transmission of data are described, in which request, data, acknowledgement and ready signals are transmitted. The disclosed systems therefore require a multiplicity of lines.

SUMMARY OF THE INVENTION

It is an object of the present invention to provide a circuit arrangement for transmitting digital data signals, which is distinguished by a small number of data and control lines.

According to the present invention, this problem is solved by using subscriber stations containing clock generators which are synchronized via a common clock line, and by having the station sending data switch the data signals to the data line during a given clock phase.

The subscriber stations can be those customary in telemetry and data processing, for instance, substations of telemetry systems, computers, data memories or, also, equipment for long-range transmission, which receives and converts the signals from the data and control line, and transmits them via one or two channels, e.g., a telephone line, or receives signals from such channels and feeds them to the data and control lines. If the data signals are transmitted serially on the data lines, they are advantageously brought, by the subscriber stations, into a form such that they can be transmitted by the equipment unchanged for long-range transmission, even though at a reduced data rate.

The synchronization of the clock generators is advantageously arranged so that the slowest clock determines the frequency of the clock signal on the clock line. This is important, for instance, in the case where one subscriber station, for instance equipment for long-range transmission, can receive the data or feed them into the data and control line only at a low rate. By slowing down its own clock, the respective next data signal will be switched by the sending station to the data line only when it is ready to receive these data. The clock signal therefore acts like the ready signal and the acknowledgement signal of the known arrangements. Since the sending station connects the data signals during a given clock phase, the clock signal also assumes the function of the request signal of the known arrangements.

The synchronization of the clocks is advantageously forced in such a manner that the clocks are blocked in a certain clock phase until all clocks have reached the same clock phase. To this end, the clock line together with the elements feeding the clock signals to the line can form an OR or coincidence stage. The clocks controlled by the signal on the clock line are therefore enabled only when all clocks switch the same signal onto the clock line, or they are blocked as long as any clock is still sending a blocking signal into the clock line. The signal appearing on the clock line can therefore be formed by AND as well as by OR logic of the clock signals. Suitable clocks are the well known astable multi-vibrators.

If not only the clock signals but also the data signals are switched to the data line after an OR or AND connection, each subscriber station can enter control signals at any time, i.e., even if no data happen to be transmitted between it and another station. So as not to interfere with the ongoing data transmission, this should be possible only at certain fixed times. Every subscriber station receives, for instance, the messages that data are to be transmitted from a first to a second station. The received messages are entered into message registers which are contained in the subscriber stations.

According to one further embodiment of the present invention, the data are transmitted in sentences of predetermined length. Each subscriber station contains a counter which adds up the clock pulses. The counter is started with the beginning of the transmission of a sentence. At given counter readings, the subscriber station is released for switching the message signals to the data line. These counter readings correspond to the times fixed for switching messages to the data lines.

The times in which messages can be transmitted can also be determined by means of auxiliary signals which are switched to the data and control lines in parallel with the data signals. Depending on the state of the auxiliary signal, the signals present on the data line means either messages or other information.

If the subscriber stations are physically far apart, the problem of the line capacities preventing transmission at high frequency arises. This problem cannot be avoided by simply inserting amplifiers since these amplifiers would have to be effective in both directions and positive feedback and oscillations would occur. According to a further embodiment of the invention, physically closely adjacent subscriber stations are combined in groups, each of which are connected together via data and control lines which are provided in pairs. The two lines of the individual line pairs are connected in parallel to the subscriber stations of a group. The respective first lines and the respective second lines of the data and control lines connecting the subscriber station groups are each connected via a line containing amplifiers, wherein the amplifiers belonging to the first line are more effective in the opposite transmission direction than the amplifiers of the amplifier groups associated with the second lines. DC isolation stages can be inserted into the lines which connect groups of subscriber stations to each other.

DETAILED DESCRIPTION OF THE INVENTION

Figure 1:
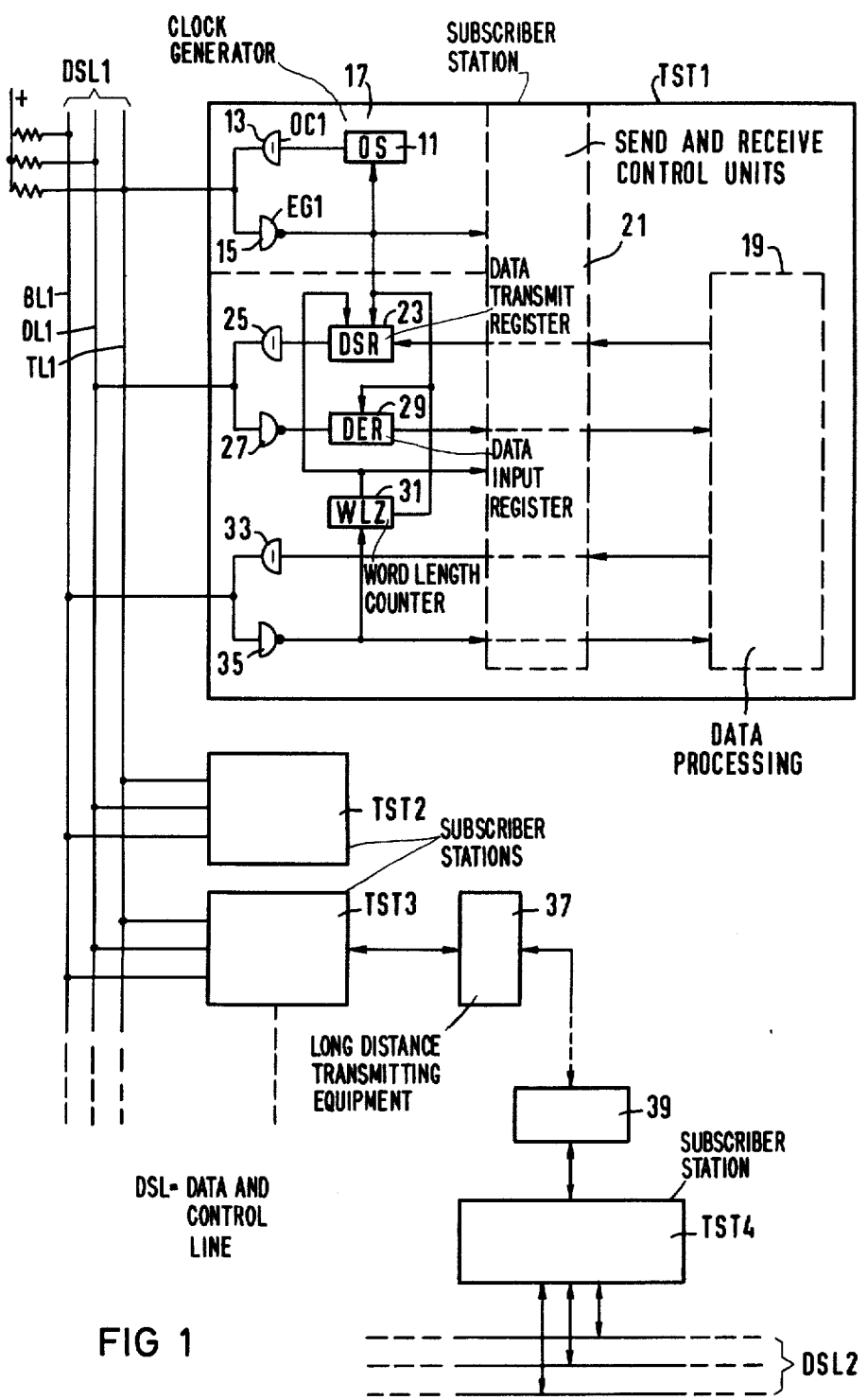
FIG. 1 is a block diagram of one embodiment of the present invention.

In FIG. 1, subscriber stations of a data processing system, for instance, a telemetry system, are designated as TST1, TST2, TST3 and TST4. Data are to be transmitted among them. For this purpose, the stations TST1, TST2 and TST3 are connected to data and control lines DSL1. Further stations can be connected to the lines DSL1. The subscriber station TST4 is connected to data and control lines DSL2, via which it can transmit data to other stations, not shown, and can receive data from them.

The individual subscriber stations are of identical design, so that it will suffice to describe design and operation of station TST1. It contains a controlled oscillator 11 which delivers its output signal to a clock line TL1 via a gate 13 which in principle is nothing but a transistor with the collector open. The signals present on line TL1 are transmitted via an input gate 15 which serves as an isolation stage, to the control input of the oscillator 11. Since the clock generators 17, which include oscillator 11 and gates 13 and 15, of all subscriber stations deliver their signal to the clock line TL1 via a transistor with the collector open, a H-signal can appear on this line only when all gates 13 deliver a H-signal. Only then does the synchronizing signal appear at the control input of the oscillator 11, not only in the subscriber station TST1 but in all other stations connected to the data and control lines DSL1. If a H-signal is defined as a logical "0", and an L-signal as a logical "1" signal, then the gates 13 of the clock generators form an OR gate. If, on the other hand, a H-signal is defined as a logical "1" and an L signal as a logical "1", then the gates 13 represent AND gates.

The data transmission is controlled by the clock signal generated on the clock line TL1. The data sources and sinks themselves are data processing arrangements 19 which give the information to be transmitted to send and receive control units 21 and also obtain from these control units the information to be received. The data to be transmitted are entered into a data transmit register 23. From this register they are transferred to a data line DL1 in the rhythm of the signal generated on the clock line TL1 via an output gate 25, which is again a transistor with the collector open. The signals present on this line DL1 are transmitted, via an input gate 27 serving as an isolating stage, to the data input register 29, into which they are likewise read in the rhythm of the signals generated on the clock line TL1. From the data input register 29 they are transferred via the transmit and receive control unit 21 into the data processing arrangement 19. Since the data are transmitted in words of predetermined length, a word length counter 31 is provided which controls the read-out of the data from the data transmit register 23. To mark the start and the end of a word, an auxiliary signal can be used which is switched via an output gate 33, which is likewise a transistor with the collector open, to an auxiliary signal line BL1. An input gate 35 transmits the auxiliary signals to the transmit and receive control unit 21, by which they can be passed on to the data processing unit 19. The received auxiliary signal can control, and for instance, reset, the word length counter 31.

In data transmission arrangements of the type shown in FIG. 1, it is frequently desired that subscriber stations can announce themselves spontaneously, for instance, in the event of an alarm. Such signals can be inserted, for instance, at certain points of a word. For instance, a word can have a length of 32 bits, of which the first 4 bits are provided for entering messages. The word length counter 31 then enables the data transmitting register 23 during the first 4 bits in any case, regardless of whether the corresponding subscriber station is participating in a current data transmission or not. Because a transistor with open collector is used as the output gate 25, an L signal is generated on the data line DL1 in any case in the event of a signal. This signal or a combination of signals which are transferred into the data receiving registers 29 via the input gates EG2, can indicate that an alarm of a certain priority is signaled by a subscriber station. The address of the station giving the alarm can be transmitted at the same time. In addition, it can be ascertained from the alarm signals which measures are to be taken, for instance that certain information is to be transmitted from station TST1 to station TST4.

Long distance transmitting equipment 37 and 39 is connected to the subscriber stations TST3 and TST4. This equipment converts the signals delivered by the stations TST3, TST4 into serial signals and to transmit them over long distances. It also receives signals arriving from the respective over long distance transmitting equipment and transfers them to the respective associated subscriber station. In this manner, data can also be exchanged between the data and control lines DSL1 and DSL2.

Figure 2:
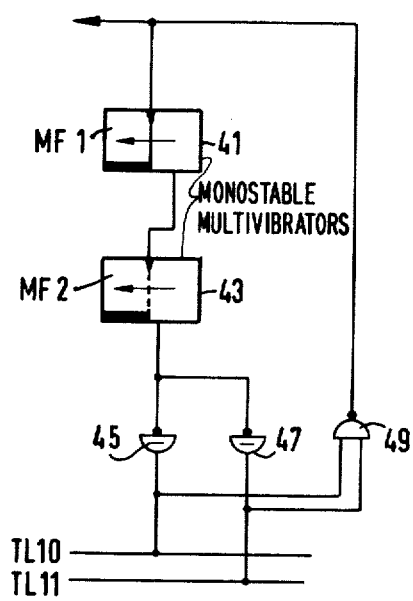
FIG. 2 depicts details of a clock generator used in the arrangement according to FIG. 1.

FIG. 2 shows an example of a clock generator. It consists essentially of two monostable multivibrators 41 and 43, which are connected in series and are alternatingly switched into the astable state. To the output of the multivibrator MF2, two output gates 45 and 47 are connected, each of which consists of a transistor with open collector and which are connected to the clock lines TL10 and TL11. Their outputs are further connected to the inputs of a coincidence gate 49, the output signal of which is fed to the control input of the multivibrator 41 as well as to the further components of the corresponding subscriber station. At first, the clock line TL11 and the output gate 47 are left off. It will further be assumed that the multivibrator 43 switches into the stable state, so that an L signal is fed to the output gate 45 and its output therefore carries no current. As soon as all output gates connected to the line TL10 are without current, a H signal is generated on the line TL10; this H signal switches the multivibrator 41 into the astable state. The duration of this state is determined by the time constant of the multivibrator 41. The H signal appearing at the output of the multivibrator MF1 is ineffective, when the latter is switched, for the multivibrator 43, so that the latter remains in the stable state. At the end of its time constant, the multivibrator 41 flips back into the stable state and with the negative flank then occurring, the multivibrator 43 is switched into the astable state, i.e., a H signal is fed to the output gate 45, so that the signal on the line TL10 is pulled to L level. This switching action is ineffective for multivibrator 41. Only when the astable phase of multivibrator 43 has ended and the output gates 45 of all subscriber stations are addressed by an L signal is the multivibrator 41 switched to the astable state again.

Figure 3:
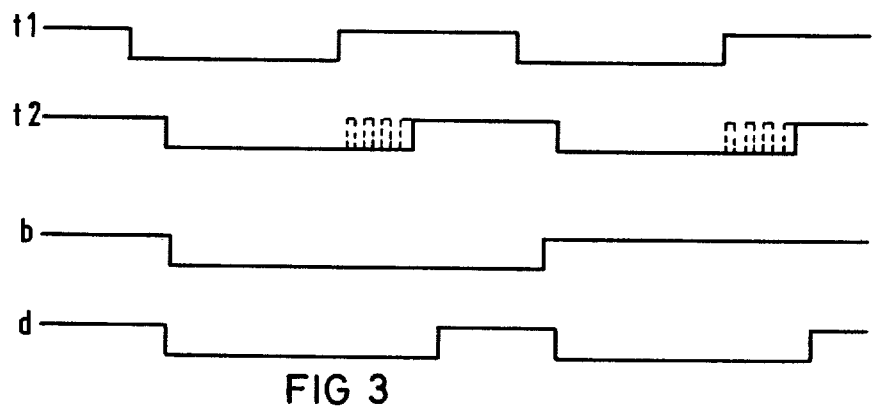
FIG. 3 shows diagrams of signals which occur in the arrangement according to FIG. 1.

The operation of the arrangement shown in FIG. 1 will be explained in greater detail in the following with the aid of the pulse diagrams shown in FIG. 3. Diagram t1 shows the waveform of the output pulse of the pulse generator of a subscriber station. This diagram will first be disregarded in the following. The solid line of diagram t2 shows the waveform of the signal present on the clock line TL1. The dashed lines indicate what waveform the output signals of the individual clock generators would have if they were not coupled via the line TL1. The coupling has the effect that the clock generator, the output signal of which goes to an L signal first, determines the time of the negative flank, and the clock generator, the output signal of which goes to a H signal last, determines the positive flank of the signal on the clock line TL1.

With the negative flank of the clock signal t2, the data signals d are switched to the data line DL1. At the same time, the auxiliary signal b becomes an L signal. In the illustrated embodiment this means that the data signal is a message. With the positive flank of the clock signal t2, the data signal d is taken back. With the next negative flank of the clock signal t2, the auxiliary signal b becomes H and the data signal d becomes L again. This means that the data signal is information other than a message. The station which happens to receive data can make its clock generator switch an L signal to the clock line TL1 only if the previously fed data signal has been received. The auxiliary signal b is set to H before the data signal d goes to L. The brief state in between with b=H and d=H indicates the start of a data word.

Figure 4:
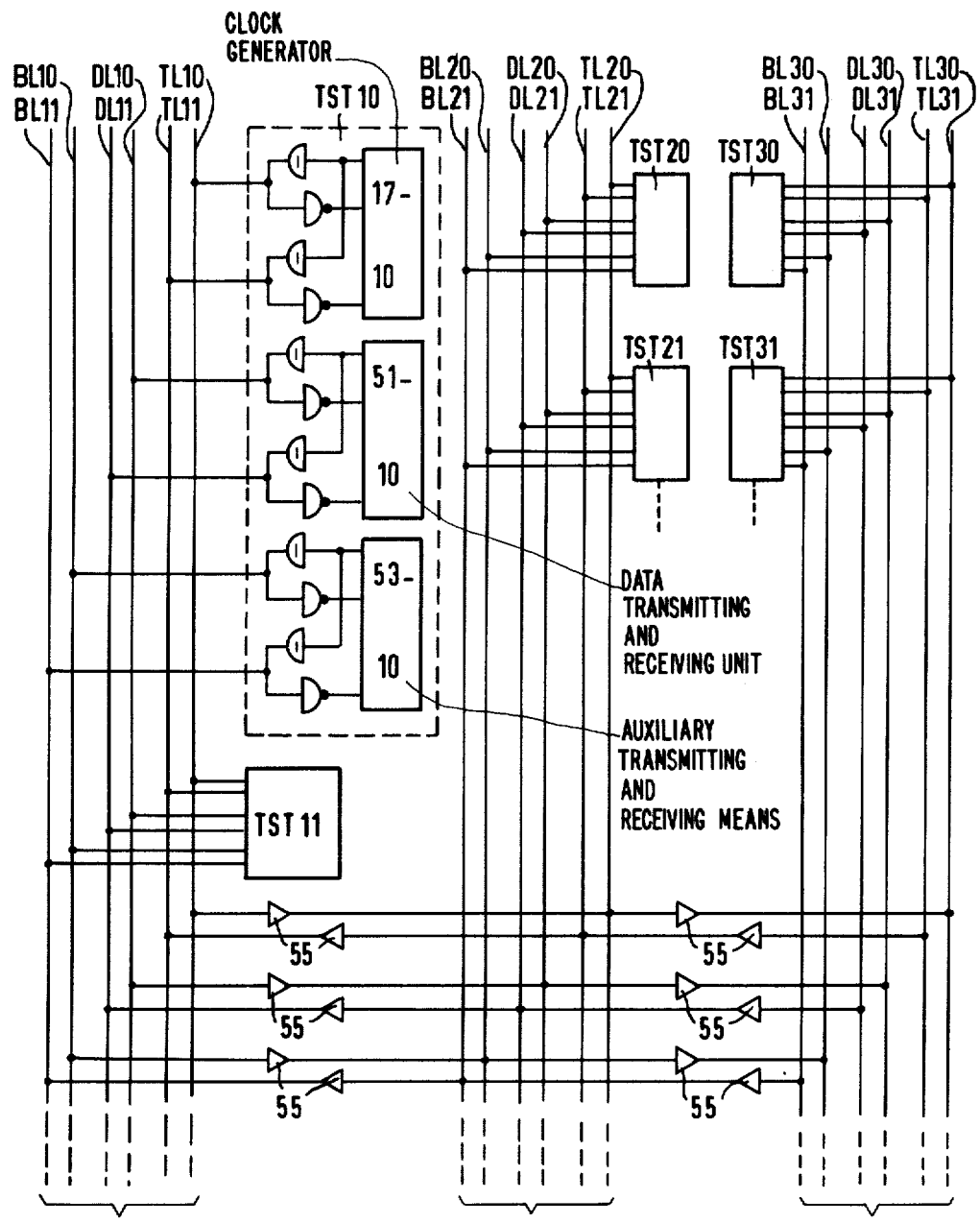
FIG. 4 is a block diagram of an embodiment with distributed subscriber stations at great distances.

In the data transmission arrangement described in FIG. 1, problems arise with respect to the speed of the transmission if the subscriber stations connected to the data and control line DSL1 or the line DSL2, respectively, are physically far apart. FIG. 4 shows an arrangement by which this problem is solved. The subscriber stations TST10 and TST11, TST20 and TST21, TST30 and TST31 which are located close together, are combined in groups, with which respective data and control lines TSL10, TSL20 and TSL30 are associated. These data and control lines differ from those of the arrangement according to FIG. 1 in that they are built up in pairs. The clock generator 17-10 of the subscriber station TST10 is therefore connected to a pair of clock lines TL10 and TL11; the data transmitting and receiving unit 51-10 of station TST10 to a pair of data lines DL10 and DL11; and the auxiliary, transmitting and receiving means 53-10 to a pair of auxiliary signal lines BL10 and BL11. The subscriber station TST11 is connected to these three pairs of clock, data and auxiliary lines in the same manner. A similar group is formed by the subscriber stations TST20 and TST21 as well as by further subscriber stations not shown, which are all connected together via a pair of clock lines TL20 and TL21, data lines DL20 and DL21 and auxiliary signal lines BL20 and Bl21. A third group is formed by the subscriber stations TST30 and TST31 as well as stations, not shown, and clock lines TL30 and TL31, data lines DL30 and DL31 and auxiliary signal lines BL30 and BL31. The corresponding clock, data and auxiliary lines of the three groups are connected together via lines into which isolation amplifiers 55 are inserted. The latter have the effect of accelerating the change of the signal level on the long connecting lines between the individual groups. Therefore, data signals can be also transmitted at high speed between a multiplicity of subscriber stations which are physically far apart.

In the following, the effect of forming pairs of the data and control lines and of the isolation amplifiers is described. It is seen from FIG. 2 that the output signals of the clock generators are applied via two output gates 45 and 47 to the pair of clock lines TL10, TL11. The signals appearing on the pair of clock lines are linked in a coincidence stage 49, i.e., the astable multivibrator formed by the two monostable multivibrators 41, 42 is released only when a H signal appears on both clock lines. In the circuit of the subscriber stations shown in FIG. 4, the clock signal on the line TL10 will lead the signal on the line Tl11 because of the shorter propagation times. The two diagrams t1 and t2 of FIG. 3 illustrate this. t1 shows in this case the waveform of the signal on the line TL10, and t2 that of the signal on the line TL11. The signal change within the individual groups is indicated by dashed lines. Only when the signals t1 and t2 are both a H signal is the conicidence condition at the input of the coincidence stage 49 met (FIG. 2), and the clock generators are released. It is therefore ensured that even in a system as branched out as in FIG. 4, the clock generators of all subscriber stations are synchronized and data transmission takes place if the subscriber stations are ready to receive. Since the data and auxiliary, transmit and receive units are connected to the line pairs of the data and control lines in the same manner as the clock generators, a description of the input and output gates can be dispensed with. Also the coupling of the data and auxiliary lines of the individual groups corresponds to that of the clock lines. Corresponding data and auxiliary lines are connected together, amplifiers being inserted into the connecting lines. The amplifiers between the one lines of the pairs of lines amplify the signals in the one direction and the amplifiers in the connecting lines between the other pairs of lines amplify in the opposite direction. In addition, optical couplers or other dc separating elements can be arranged in the connecting lines.

What is claimed is:

1. In an arrangement for transmitting data signals between subscriber stations which are connected to common data and control lines, in which at least the signals of the control lines are formed by logically combining the output signals of the subscriber stations and in which the data sending station switches the data signals, during a given phase of a control signal on a control line, to the data line and the data receiving station transmit an indication of the receipt of the data and a control signals indicating readiness for receiving new data to the sending station, whereupon the sending station is adapted to remove the data signals then present on the data line and provide new data, the improvement comprising:

a clock generator in each subscriber station;

a common clock line;

means synchronizing all of said clock generators by means of said common clock line such as to hold all clock generators in a given clock phase until all clock generators are enabled for the next clock phase; and means to cause the data sending stations to switch data signals to the data line during a given clock phase; and means in the stations receiving the data signals adapted to enable the clock generators contained therein for the next phase only when the data signals have been transferred.

2. The improvement according to claim 1, wherein said clock generators comprise an astable multivibrator which is enabled or blocked by the signals present on the clock line.

3. The improvement according to claim 2, wherein said clock generators each comprise two monostable multivibrators connected in series one of said multivibrators being enabled or blocked by the signal present on the clock line.

4. The improvement according to claim 1, wherein data signals are switched to the data line via an OR circuit and message signals are adapted to be switched at predetermined times from each subscriber station to the data line.

5. The improvement according to claim 4, wherein data signals are transmitted in sentences of predetermined length, and wherein each subscriber station includes a word length counter to add up the pulses of its respective clock generator; means to start said word length counter with the beginning of the transmission of a sentence; and means for enabling each subscriber station for switching message signals to the data line at certain counter readings.

6. The improvement according to claim 5, and further including an auxiliary signal line to which auxiliary signals are applied which mark the beginning of the data sentences.

7. The improvement according to claim 4 and further including an auxiliary signal line, to which auxiliary signals are applied which indicate the type of data transmitted.

8. The improvement according to claim 4 and further including a message register at each subscriber station into which the messages fed to the data line are stored.

9. The improvement according to claim 1 wherein subscriber stations located close together are combined in groups which are connected via respective data and control lines said data and control lines being provided in pairs and said subscriber stations of a group being connected in parallel to the lines of the line paris via decoupling elements; and wherein the first lines of the corresponding pairs of lines of the data and control lines connected the subscriber stations of a group, as well as the second lines of the corresponding line pairs are coupled to the corresponding lines of another group via first and second connecting lines, said connecting lines containing amplifiers with opposite respective direction of transmission.

10. The improvement according to claim 9, and further including DC isolating stages inserted into the connecting lines.

* * * * *